US012694770B2

(12) United States Patent
Pfanner

(10) Patent No.: US 12,694,770 B2
(45) Date of Patent: Jul. 28, 2026

---

(54) NOTIFICATION UNIT, WARNING SYSTEM AND METHOD FOR OPERATING A WARNING SYSTEM

(71) Applicant: Pfanner Schutzbekleidung GmbH, Koblach (AT)

(72) Inventor: Anton Pfanner, Hohenems (AT)

(73) Assignee: Pfanner Schutzbekleidung GmbH, Koblach (AT)

( * ) Notice: Subject to any disclaimer, the term of this patent is extended or adjusted under 35 U.S.C. 154(b) by 0 days.

(21) Appl. No.: 18/692,928

(22) PCT Filed: Sep. 16, 2022

(86) PCT No.: PCT/EP2022/075796
§ 371 (c)(1),
(2) Date: Mar. 18, 2024

(87) PCT Pub. No.: WO2023/041719
PCT Pub. Date: Mar. 23, 2023

(65) Prior Publication Data
US 2024/0386787 A1 Nov. 21, 2024

(30) Foreign Application Priority Data

Sep. 17, 2021 (DE) .......................... 102021124108.1

(51) Int. Cl.
*G08B 13/196* (2006.01)
*G01P 13/00* (2006.01)
(Continued)

(52) U.S. Cl.
CPC .......... *G08B 13/1961* (2013.01); *G01P 13/00* (2013.01); *G01S 17/04* (2020.01); *G08B 7/06* (2013.01); *G08B 13/19608* (2013.01)

(58) Field of Classification Search
CPC . G08B 13/1961; G08B 13/19608; G08B 7/06
See application file for complete search history.

(56) References Cited

U.S. PATENT DOCUMENTS

| | | | | |
|---|---|---|---|---|
| 5,485,978 A | * | 1/1996 | Hernandez | ............ A01M 31/02 |
| | | | | 248/188.7 |
| 6,059,266 A | * | 5/2000 | Ascherin | .............. B66D 1/7431 |
| | | | | 254/326 |

(Continued)

FOREIGN PATENT DOCUMENTS

| | | | | | |
|---|---|---|---|---|---|
| CN | 112863009 A | * | 5/2021 | ............. | G10L 17/00 |
| CN | 112863099 A | | 5/2021 | | |

(Continued)

OTHER PUBLICATIONS

Office Action in German patent application 10 2021 124 110.3 issued May 25, 2022 by the DPMA (German Patent and Trademark Office), partial machine translation provided.

(Continued)

*Primary Examiner* — Hoi C Lau
(74) *Attorney, Agent, or Firm* — Shakir Law PLLC; Hassan Abbas Shakir

(57) ABSTRACT
A notification unit includes at least one motion sensor, which detects movements of objects in the environment of the notification unit, and at least one signal device which is suitable for outputting different optical and/or acoustic signals, wherein the type of the different optical and/or acoustic signals depends on whether the motion sensor has detected a movement of an object in the environment of the notification unit, wherein the notification unit is at least partially formed as a column defining a cavity with a first end and a second end and wherein functional components of the notification unit are disposed in the cavity. A warning system and a method for operating a warning system are provided.

16 Claims, 8 Drawing Sheets

(51) Int. Cl.

| | |
|---|---|
| *G01S 17/04* | (2020.01) |
| *G08B 7/06* | (2006.01) |

(56) References Cited

U.S. PATENT DOCUMENTS

| | | | | |
|---|---|---|---|---|
| 6,118,375 | A | 9/2000 | Duncan | |
| 6,283,455 | B1* | 9/2001 | Ascherin | B66D 1/7442 |
| | | | | 254/326 |
| 6,480,115 | B2* | 11/2002 | Ghahramani | B60Q 7/00 |
| | | | | 340/505 |
| 6,528,714 | B1* | 3/2003 | Liao | G10D 13/065 |
| | | | | 84/422.1 |
| 7,088,284 | B2* | 8/2006 | Young | G01S 13/04 |
| | | | | 342/28 |
| 7,327,253 | B2* | 2/2008 | Whitten | G08B 13/19643 |
| | | | | 340/556 |
| 8,905,870 | B1* | 12/2014 | Stafford | A63B 63/00 |
| | | | | 473/454 |
| 9,728,085 | B2* | 8/2017 | Schwarz | G08G 1/017 |
| 9,940,839 | B2* | 4/2018 | Stafford | E01F 9/615 |
| 10,192,418 | B1 | 1/2019 | Kern | |
| 10,614,688 | B1* | 4/2020 | Pachikov | G08B 31/00 |
| 11,079,090 | B1 | 8/2021 | Ishida | |
| 12,020,558 | B2* | 6/2024 | Cho | G08B 5/006 |
| 2005/0104764 | A1* | 5/2005 | Young | G01S 13/04 |
| | | | | 342/27 |
| 2005/0270175 | A1* | 12/2005 | Peddie | G08G 1/096783 |
| | | | | 246/473 R |
| 2006/0170548 | A1* | 8/2006 | Leen | G08B 13/19 |
| | | | | 340/545.2 |
| 2006/0250237 | A1* | 11/2006 | Whitten | G08B 13/19643 |
| | | | | 340/541 |
| 2007/0235605 | A1* | 10/2007 | Voelz | G10D 13/28 |
| | | | | 248/188.8 |
| 2008/0224849 | A1* | 9/2008 | Sirhan | H05B 45/22 |
| | | | | 340/521 |
| 2011/0012734 | A1 | 1/2011 | Reese et al. | |
| 2012/0067752 | A1* | 3/2012 | Bohurjak | A45F 3/04 |
| | | | | 248/419 |
| 2012/0114484 | A1* | 5/2012 | Tosello | E02D 27/52 |
| | | | | 29/889 |
| 2013/0199251 | A1* | 8/2013 | Taylor | E05B 73/0082 |
| | | | | 340/568.1 |
| 2015/0305115 | A1* | 10/2015 | Vora | H05B 47/155 |
| | | | | 340/12.22 |
| 2016/0321921 | A1* | 11/2016 | Stafford | B60Q 7/00 |
| 2018/0347752 | A1* | 12/2018 | Costello | G01S 17/89 |
| 2019/0259256 | A1* | 8/2019 | Fairweather | E01F 9/654 |

| | | | | |
|---|---|---|---|---|
| 2021/0237777 | A1* | 8/2021 | Selevan | G06V 20/56 |
| 2021/0241597 | A1 | 8/2021 | Gali et al. | |
| 2021/0400175 | A1* | 12/2021 | Dunn | F16M 11/16 |
| 2022/0157135 | A1* | 5/2022 | Cho | F16P 3/147 |
| 2022/0381394 | A1* | 12/2022 | Jankura | F16M 11/14 |
| 2024/0386787 | A1* | 11/2024 | Pfanner | G08B 7/06 |
| 2024/0386788 | A1* | 11/2024 | Pfanner | G08B 13/19613 |

FOREIGN PATENT DOCUMENTS

| | | | | | |
|---|---|---|---|---|---|
| DE | 2202131 | C3 | 2/1983 | | |
| DE | 102016100086 | A1 | 7/2017 | | |
| EP | 2598376 | B1 | 10/2014 | | |
| EP | 3399880 | A1 | 11/2018 | | |
| EP | 3399880 | B1 * | 4/2020 | | A42B 3/16 |
| EP | 3593032 | B1 | 6/2021 | | |
| EP | 4213123 | A1 | 7/2023 | | |
| WO | WO-2008105187 | A1 * | 9/2008 | | G08B 15/00 |
| WO | 2014183179 | A1 | 11/2014 | | |
| WO | 2018220150 | A1 | 12/2018 | | |
| WO | WO-2020190988 | A1 * | 9/2020 | | G08B 13/187 |
| WO | 2021233636 | A1 | 11/2021 | | |
| WO | 2022054345 | A1 | 3/2022 | | |

OTHER PUBLICATIONS

Office Action in German patent application 10 2021 124 108.1 issued May 25, 2022 by the DPMA (German Patent and Trademark Office), partial machine translation provided.

International Search Report in PCT Application PCT/EP2022/075796 issued by the European Patent Office and dated Feb. 3, 2023, 6 pgs, official translation provided.

Written Opinion by the International Searching Authority in PCT Application PCT/EP2022/075796 issued by the European Patent Office and dated Feb. 3, 2023.

International Search Report in PCT Application PCT/EP2022/075797 issued by the European Patent Office and dated Dec. 19, 2022, 3 pgs, official translation provided.

Written Opinion by the International Searching Authority in PCT Application PCT/EP2022/075797 issued by the European Patent Office and dated Dec. 19, 2022.

Examination Report No. 3 in related Australian patent application 2022348167 dated Nov. 20, 2025 and issued by IP Australia, 5 pgs. in English.

Patent Examination Report 1 in related New Zealand patent application 809801 dated Dec. 16, 2025 and issued by the New Zealand Intellectual Property Office, 9 pgs., in English.

Examination Report with cover letter in related Indian patent application 202447029681 dated Jan. 21, 2026 and issued by the Indian Patent Office, 8 pgs., in English.

\* cited by examiner

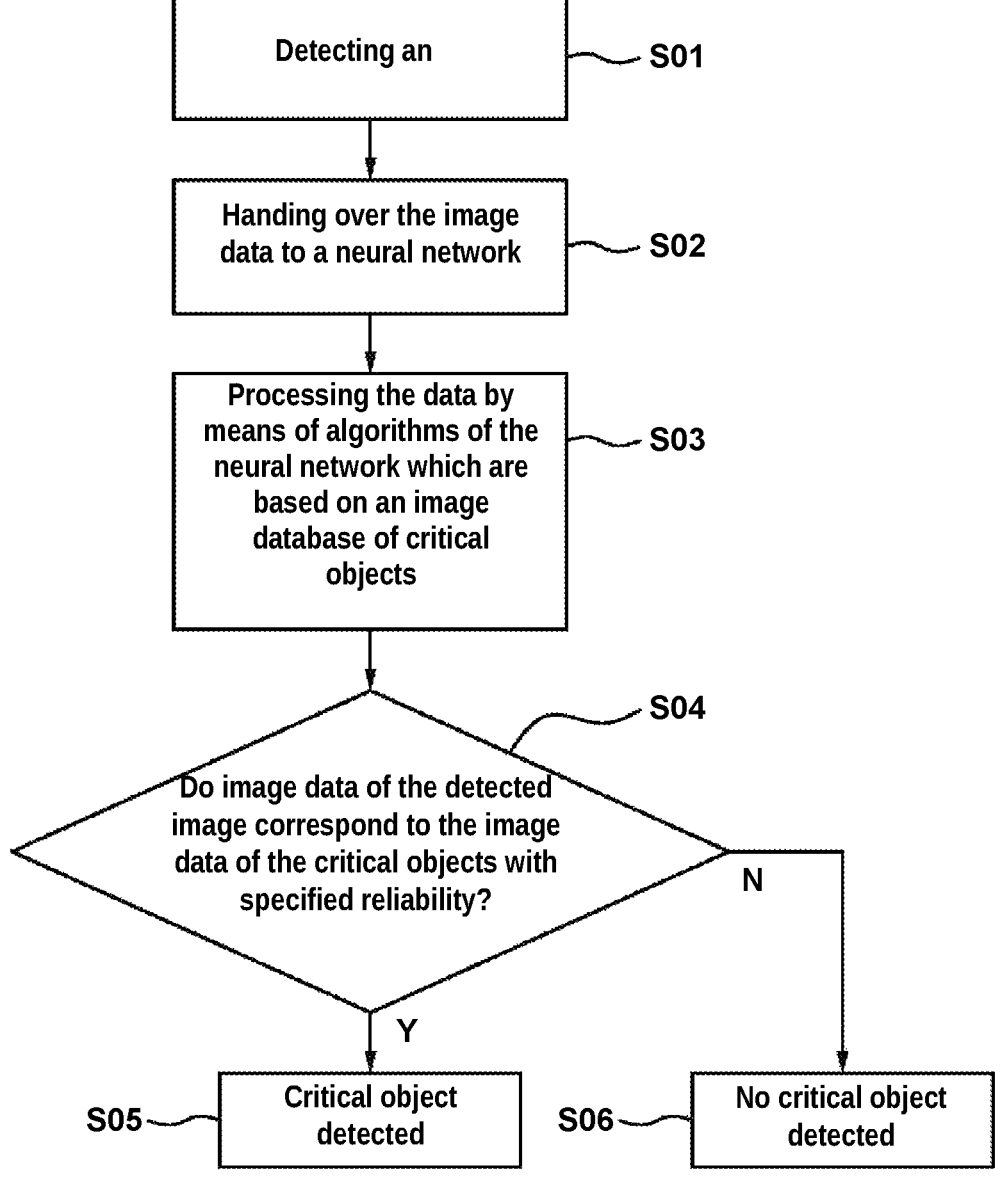

Detecting an — S01

Handing over the image data to a neural network — S02

Processing the data by means of algorithms of the neural network which are based on an image database of critical objects — S03

S04

Do image data of the detected image correspond to the image data of the critical objects with specified reliability?

N

Y

S05 — Critical object detected

S06 — No critical object detected

FIG. 10

NOTIFICATION UNIT, WARNING SYSTEM AND METHOD FOR OPERATING A WARNING SYSTEM

CROSS-REFERENCE TO RELATED APPLICATIONS

This application is a national stage under 35 U.S.C. § 371 of PCT patent application PCT/EP2022/075796 filed on 16 Sep. 2022, which is pending and which is hereby incorporated by reference in its entirety for all purposes.

PCT/EP2022/075796 claims priority to German Patent Application 10 2021 124108.1 filed 17 Sep. 2021, which is hereby incorporated by reference in its entirety for all purposes.

BACKGROUND OF THE INVENTION

1. Field of the Invention

The invention is directed to a notification unit, a warning system and a method for operating a warning system, in particular for supporting safety during forestry work.

2. Discussion of the Related Art

If, for example, tree felling work is carried out in a forest, it will be necessary to amply cordon off the area in which the work takes place. This is to prevent particularly uninvolved persons from being injured by falling branches or even falling trees. However, it cannot always be assumed that all persons respect the cordoning off of the restricted area to be created, so that persons enter danger zones despite these being cordoned off. It also happens that people overlook the cordoning off and are put at risk for this reason.

Therefore, it would be desirable to offer persons an additional possibility to notice their entry into a restricted area and to possibly also indicate to a responsible person that entry into a restricted area by an unauthorized person is imminent or has already taken place.

The object of the invention is to provide a warning system which reliably prevents persons from entering a restricted area and optionally indicates to a responsible person that an unauthorized person may be located in a restricted area.

SUMMARY OF THE INVENTION

The invention consists of a notification unit comprising at least one motion sensor, which detects movements of objects in the environment of the notification unit, and at least one signal device which is suitable for outputting different optical and/or acoustic signals, wherein the type of the different optical and/or acoustic signals depends on whether the motion sensor has detected a movement of an object in the environment of the notification unit, wherein the notification unit is at least partially formed as a column defining a cavity with a first end and a second end and wherein functional components of the notification unit are disposed in the cavity. The column-like structure the notification unit has at least partially offers numerous advantages. A column is noticeable, and it can be disposed in virtually any place without excessive space requirements. A column may provide a large cavity in which the functional components of the notification unit are disposed. The arrangement may be quite variable as a cavity in a column does not involve any particular restrictions concerning the shape and size of the functional components. Within the context of the present disclosure, the term column or column-like structure is used when the vertical dimensions are significantly larger than the horizontal dimensions in a corresponding arrangement. For example, the term column may be used when the vertical dimension is at least twice as large as the horizontal dimension, at least in sections. The column and its cavity may, for example, be formed by a tube of any shape. According to a preferred embodiment, such a tube is at least partially cylindrical. In order for it to be possible to carry optical signals of an optical signal device disposed in the tube out of the cavity of the column as far as the boundary of the cavity is at least partially transparent.

Likewise, transparency in the area of a motion sensor disposed in the column is required in case the motion sensor works on an optical basis. According to a preferred embodiment, all functional components of the notification unit may be accommodated in the cavity of the column so that they are protected from external influences, for example from weather conditions and mechanical influences during setup and dismantling of the notification unit and in case of possible vandalism.

It is especially advantageous that an optical signal device is provided in the cavity which has several LEDs. Variable and intensive effects can be created with modern LED technology. The LEDs may have different colors so that signals can be output in different ways based on a color choice. The LEDs may be driven with differing power so that optical signals may be of varying intensity. Furthermore, LEDs operate at a comparatively low power so that a limited energy supply in the notification unit, which is provided by a rechargeable battery, for example, lasts a long time.

It is especially preferred that the cavity is delimited by an acoustic signal device at the first end of the column. This arrangement of an acoustic signal device is particularly useful if the cavity is hermetically sealed to in particular protect the components disposed therein from external influences. Then, the acoustic signal device, a loudspeaker, for example, is terminally attached to the column, for example as a termination of the cylindrical tube so that sound may exit into the environment without being impeded by the otherwise hermetic sealing of the cavity.

It is especially advantageous that a camera which is both the motion sensor and an image capturing unit is disposed in the cavity. Thus, such a camera can be active either all the time or only if required, wherein it outputs corresponding signals in case of changes in its field of view in order to execute the function of a motion sensor. As soon as it detects a change in the field of view of the camera, the camera can then also execute its further function, i.e. capturing an image. The camera may also execute its functions as a motion sensor and as an image capturing sensor in the dark. It may be provided that the notification unit is not only equipped with LEDs which emit light in the visible range, but also with infrared LEDs. Thus, permanent monitoring can take place.

Furthermore, it can be provided that the cavity is delimited by a cooling body at the second end of the column. Excess heat, which is created by the functional components within the cavity, is efficiently discharged via such a terminal cooling body which, for example, forms an upper extending end of the column-like structure.

It can also be provided that a GPS antenna is provided at the second end of the column. As the second end of the column preferably forms the upper boundary of the notification unit during operation, a GPS antenna is positioned particularly well in this location as the least amount of disturbances concerning the reception and sending operation of the GPS antenna is to be expected here. Such a GPS antenna communicates with a GPS module within the notification unit so that the notification unit is locatable at all times.

Furthermore, it is advantageous that the LEDs are disposed adjacent to the cooling body. Even if LEDs generally discharge only little heat compared to other lights, there still is a cooling demand in this area when light output is high. As such, the cooling body being adjacent to the LEDs is advantageous.

Furthermore, the invention is advantageously configured such that a controller unit is provided adjacent to the acoustic signal device. From bottom to top, the functional components are disposed in the order of acoustic signal device, controller unit, light unit, cooling body. The camera is preferably positioned at the level of the controller unit. A rechargeable battery, if provided within the cavity, can take any position. At lower outer temperatures, it is useful to keep the rechargeable battery at temperatures which are as high as possible in order to extend the charging cycle. This can be achieved, for example, by guiding heat, which is discharged by other functional components within the cavity, to the rechargeable battery if required, i.e., in particular at low outer temperatures. This may be accomplished with the help of a small fan and/or with variably adjustable, in particular automatically adjustable air guiding elements. For purposes of heating the rechargeable battery, a rechargeable battery heater may additionally be provided. The controller unit may in particular contain a Bluetooth interface and a WiFi interface.

Furthermore, the setup of the notification unit is preferably designed such that an electrical interface is provided at the first end of the column. This first end of the column, which preferably is at the bottom of the notification unit during operation, offers the possibility of supplying electrical energy, either from an external rechargeable battery or for charging an internal rechargeable battery. Further, the electrical interface may also be formed as a data interface.

It can also be provided that a mechanical interface for coupling the column to a carrier may be provided at the first end of the column. Such a mechanical interface may have the shape of a flange so that the column may be fastened to a counter flange by means of screws. Likewise, the mechanical interface may be a component of a bayonet connection.

It is further advantageous that the carrier is a tripod with three feet. With such a tripod, the notification unit can be positioned in a variable manner, in particular also in terrain where there often is uneven underground.

In this context, it is useful that an anchoring device is provided for at least one of the feet. As with the column-like notification unit, which is attached to a tripod, the center of gravity is disposed relatively high, an anchoring may be advantageous as it protects from unintentionally or intentionally knocking over the notification unit and protects the notification unit from falling over due to weather conditions, in particular due to a storm.

It is provided that the anchoring device has a first base plate to be disposed parallel to the ground and a second leg plate to be disposed parallel to the leg, wherein the base plate and the leg plate are pivotably connected to one another via a pivot axis. Through the relative pivotability of the leg plate and the base plate, anchoring may be performed in any, also uneven, ground.

Specifically, it is provided that the base plate has a recess for a foot of the tripod to pass through and a hole for a fastening anchor to pass through. Thus, the foot of the tripod passes through the base plate in a compact manner. Then, a peg or a ground screw can serve as a fastening anchor, for example.

It can furthermore be provided that the leg plate has a longitudinal hole for variably fastening a foot of the tripod. Therefore, there are still further adjustment options with regard to unfavorable terrain conditions by being able to variably fasten the foot at different heights in the longitudinal hole of the leg plate.

The invention further consists of a warning system comprising at least one mobile notification unit defined above, as well as a central unit which is suitable for receiving a signal sent via radio from the at least one notification unit and to then output a notification to a user of the central unit. The mentioned objects primarily are persons or groups of persons. They may, however, also be other objects such as animals, manned or unmanned vehicles as well as manned or unmanned aircrafts. So, in particular, if a person enters a restricted area unintentionally, this person will be warned by means of an optical and/or acoustic signal. There is a high probability that this person will then retreat. In parallel, a signal indicating that an entry into the restricted area has taken place is transferred to a central unit via radio, for example long-wave radio. Similarly, a signal can also be output when the person has left the restricted area. The system may be effective in case of intended entry into the restricted area as well. The acoustic and/or optical signaling can be deterrent such that any intentional attempt to enter the restricted area will be stopped, comparable to the effect of an alarm system on a residential building. If it is further signaled to the central unit that a person has entered the restricted area and the user of the central unit establishes that no subsequent exit from the restricted area takes place, the dangerous forestry work can be suspended temporarily and the person can be searched for and taken to a safe place on this basis. Even if the warning system with its signal device is suitable for outputting an optical and/or acoustic signal, it may sometimes be desirable not to have a signal output, although a movement of an object is detected in the environment of the notification unit. In other words, the user of the warning system might possibly desire that only a signal will be sent to the central unit. In this case, the person approaching the notification unit will not know that he or she has been detected. This can for example assist in the arrest of criminals. Further, in the private domain, it may be undesired to create disturbing optical or acoustic signals in the area of notification units. The notification unit can also be further developed such that signs or banners held by the notification unit are equipped with lighting. They can be illuminated, for example, by LED borders. These LED borders may be operated permanently or as a flashing light, wherein the mode of operation-permanent or flashing-may depend on whether an object has been detected. The optical signals in the area of the notification unit may be movements of the components of the notification unit as well, for example movements of signs and/or banners.

In particular, it is useful that a location of the object is detectable with the notification unit and that the optical signal and/or the acoustic signal and/or the sent signal are changeable as a function of the detected location. Thus, the person approaching the notification unit can be alerted early by the motion sensor so that entry into the restricted area does not occur in the first place. In principle, signaling to the central unit is dispensable in this case. As soon as it is established that the person is crossing or has already crossed the boundary of the restricted area, it is inevitable to send a signal to the central unit. Further, by changing the type of the optical and/or acoustic signal, the person can be warned of the fact that now not only a warning is present, but that the person is actually located in the restricted area now and the person's life is in danger. Generally, a signal change can be useful whenever a critical position change of the object is detected. If the object approaches the boundary marked by the notification unit, for example, the signaling can become more intensive. It becomes particularly intensive if the person enters the restricted area. Conversely, the signaling may become less intensive again if the person eventually ends up leaving the restricted area or distances themselves from the boundary of the restricted area by moving to non-critical areas.

It is usefully provided that the central unit is couplable to a communication unit disposed within a hearing protection of the user so that the notifications can be output via the hearing protection to the user. The user of the central unit will usually be a forestry worker who works alone, who is a superior to several other forestry workers or who is charged with the special task of operating and using the warning system. As, during forestry work, a hearing protection is commonly worn, whether it is an isolated hearing protection or a hearing protection connected to a safety helmet, it might be difficult to call the attention of the user of the central unit to a signal received by the central unit, namely when it is an acoustic signal. This is remedied by the fact that the hearing protection is equipped with a communication device which can be activated by the central unit. The user can perceive a special signal via the hearing protection using the communication unit or a spoken message as well, such as "Person in restricted area". The communication of the central unit with the communication device of the hearing protection usefully occurs via wireless communication, preferably via Bluetooth. Bluetooth-enabled hearing protection components are known and available. Even though the present invention is explained mainly using forestry work as an example, it can be used in a large number of other environments as well. For example, it may be desirable to prevent or detect the entry of persons to building sites. It may be useful as well to equip any other protected areas with the warning system, for example in the health system.

It is provided in preferred embodiments that the central unit is a cellular phone or is couplable to a cellular phone. Considering the communication of the central unit with a Bluetooth communication device of a hearing protection, the advantages are obvious since cellular phones can readily be used for Bluetooth communication.

It is useful as well that the cellular phone is equipped with an application indicating on a display of the cellular phone that a movement of an object has been detected in the environment of the notification unit. Thus, the application (an app) on the cellular phone displays all events in the restricted area and the events can be saved as well in order to be able to reconstruct at a later point in time what happened in the restricted area at which points in time.

According to another useful embodiment, it is provided that several notification units are provided and that the type of the notifications output at the central unit depends on which notification unit has sent a signal. This offers decisive advantages in particular for large restricted areas. On this basis, the user of the central unit knows from where a person approaches so that he or she can take appropriate measures.

Furthermore, it is useful that the notification unit comprises an identification module which is suitable for detecting at least one property of the object. For example, the property of the object may be an authorization to enter the restricted area. A forestry worker, for example, can be equipped with an RFID chip that is registered by the identification module in the notification unit. In this case, an alarm can be suppressed, since it is to be assumed that the forestry worker identified by means of the RFID chip knows how to move and behave in the restricted area. Even if no alarm occurs, it may, however, be provided nevertheless that a signal is sent to the central unit. The display of a cellular phone will then no longer show "Person in restricted area", but "Authorized person in restricted area". In this case, the user of the central unit does not have to take any measures. The identification module can also comprise a device for face detection such that it may be actually detected that it might be an authorized person who enters the restricted area. Conversely, certain persons can also experience a "special treatment". If a user of the central unit wishes to be alerted of the fact that certain persons enter the restricted area, the face detection features of these persons may result in special messages at the central unit, for example "Forester Meier enters restricted area". The identification module may also be or comprise a body temperature detection module. Thus, the notification unit may react to persons having a normal body temperature in another way than to persons having a high body temperature. This may be useful for infection control, namely when it should be avoided that infected persons, who often have a high body temperature, enter a restricted area. For persons having a normal body temperature, for example, an output of a message to the central unit can be suppressed. Or a message like "Non-infected person enters restricted area" will be output at the central unit. If, however, the person has a high body temperature, a message like "Potentially infected person enters restricted area" can be output at the central unit. For persons having a normal body temperature, an output of optical and/or acoustic signals at the notification unit might be dispensed with. For persons having a high body temperature, however, such a signal output at the notification unit may occur. However, it may also be appropriate not to have signals output at the notification unit in case of potentially infected persons, in particular for reasons of data protection. The identification module of the notification unit can also be suitable to cooperate with an application on a cellular phone or a separate device carried by the person who approaches the notification unit. For example, the application or the device may save whether the person concerned was near persons known to be infected. On this basis, different reactions may in turn be taken. As for the detection of body temperature, different messages may be output at the central unit. Different or no signals can be output at the notification unit as well, as for the detection of body temperature.

Furthermore, the invention consists of a method for operating a warning system, in particular a warning system as described above, having the steps of:

optically monitoring a monitoring area, detecting a critical object and a location of the critical object in the monitoring area, activating a first alarm through the and on the notification unit, detecting a critical location change of the object, activating a second alarm, which is different from the first alarm, through the and at the notification unit.

Thus, the advantages of the warning system according to the invention are implemented within the context of an operating method.

BRIEF DESCRIPTION OF THE DRAWINGS

The invention will now be explained with reference to the accompanying drawings by way of examples.

FIG. 10 is a flow chart of a method for image recognition.

DETAILED DESCRIPTION OF THE INVENTION

Figure 1:
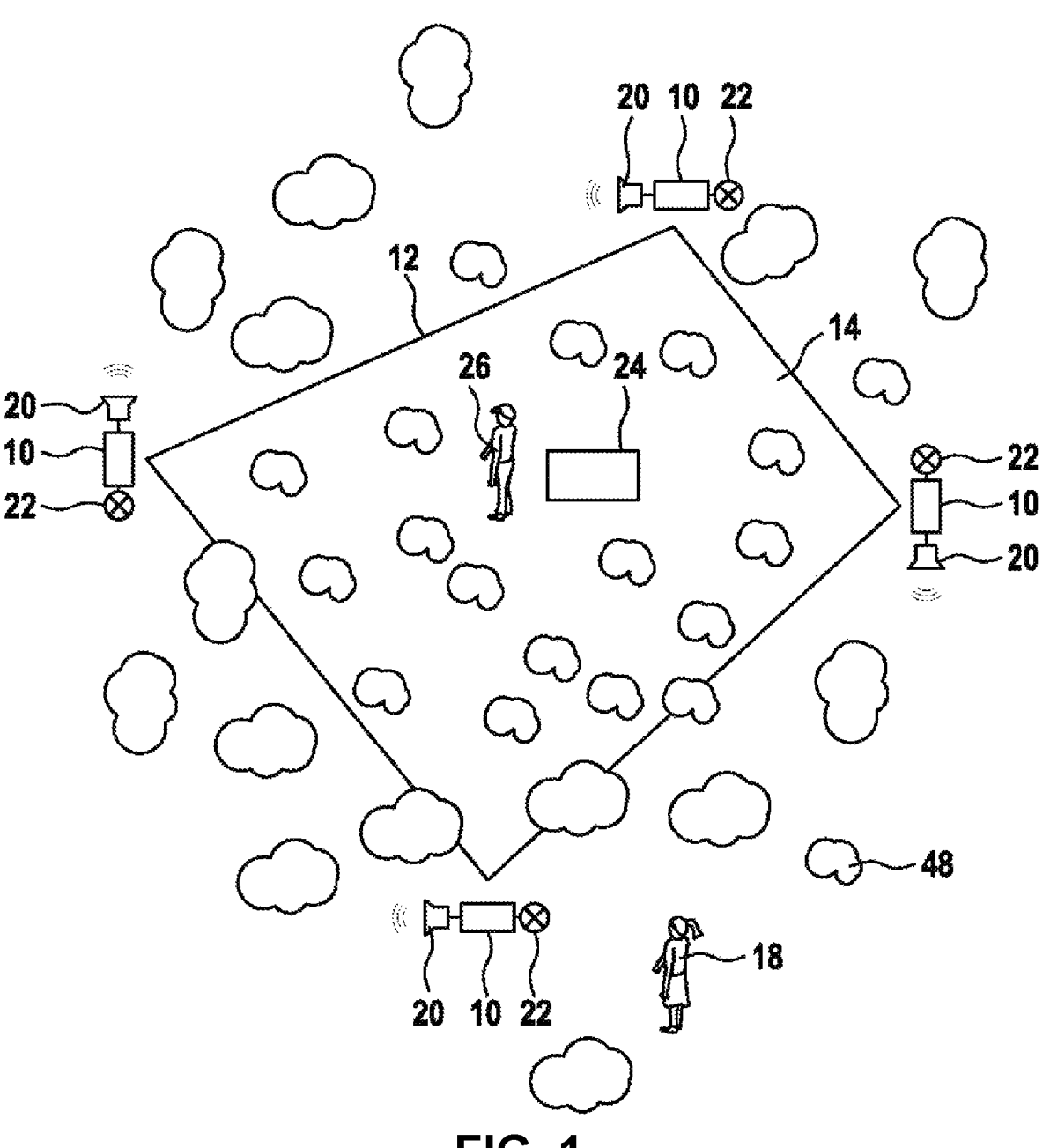
FIG. 1 shows a top view of a forest comprising a restricted area and a warning system according to the invention.

FIG. 1 shows a top view of a forest comprising a restricted area and a warning system according to the invention. A woodland comprising a large number of trees 48 is shown. A part of this woodland is identified as restricted area 14, the restricted area 14 being surrounded by a boundary 12. At said boundary 12 or near said boundary 12, several notification units 10 are disposed. In the present example, the notification units are located at the corners of the boundary 12. This, however, is not mandatory. It is possible as well that notification units are additionally established at the straight parts of the boundary 12. Further, it is not absolutely required that notification units are disposed at the corners of the restricted area 14. It is important that, for the length of the boundary 12, a sufficient number of notification units 10 is disposed. In the present example, each notification unit 10 has a signal device 20 for the output of an acoustic signal, for example a loudspeaker, and a signal device 22 for the output of an optical signal, for example an LED. It is not necessary that both an acoustic and an optical signal device are provided. The notification units 10 can manage with only one of the stated signal devices as well. Within the restricted area 14, there is the user 26 of a central unit 24 as well as the central unit itself. As soon as an object 18, that is in particular a person, approaches a notification unit 10, said notification unit 10 emits an acoustic and/or optical signal. At the same time, a signal is transferred to the central unit 24, for example within the long-wave range. This is how the user 26 of the central unit 24 is informed of the fact that an object 18 is approaching the restricted area, is crossing or has already crossed the boundary 12 of the restricted area 14. The notification given to the user 26 of the central unit 24 may include information as to whether the object 18 is an object which is authorized or unauthorized to enter the restricted area 14. Further, the user 26 of the central unit 24 can be informed of the fact which of the notification units 10 detected the object 18. Here, a restricted area 14 in a forest is described. The system may also be employed for monitoring construction sites, avalanche slopes and shooting ranges, just to mention a few more examples.

Figure 2:
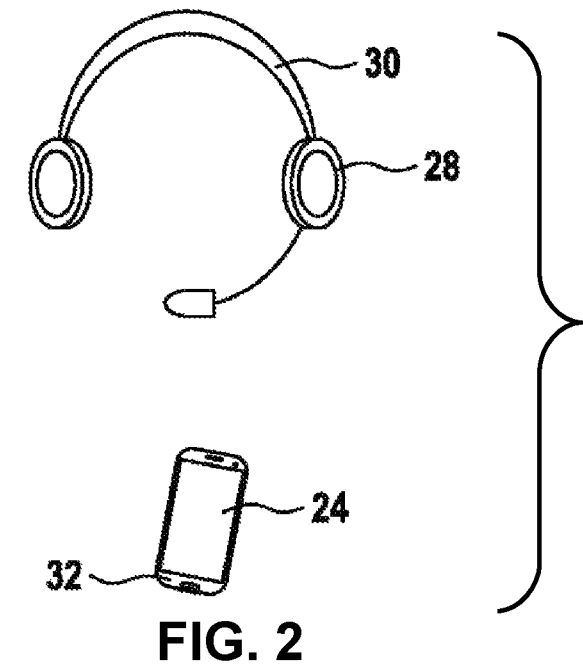
FIG. 2 shows an equipment of a user of the warning system.

FIG. 2 shows an equipment of a user of the warning system. In this preferred case, the central unit 24 is a commercially available Bluetooth-enabled cellular phone 32. The user 26 of the central unit 24 and of the cellular phone 32, respectively, wears a hearing protection 30 having a communication unit 28. Preferably, this communication unit 28 is Bluetooth-enabled as well. Thus, the cellular phone 32 can supply the user 26 wearing the hearing protection 30 with an acoustic signal or an acoustic message via the response of one of the notification units. At the same time or alternatively, information can be displayed on the display of the cellular phone 32 that state in more detail what is currently happening or what happened at any time. Thus, the user of the warning system may be notified acoustically and/or optically. It is also possible to notify the user through vibration, for example, or generally tactilely.

Figure 3:
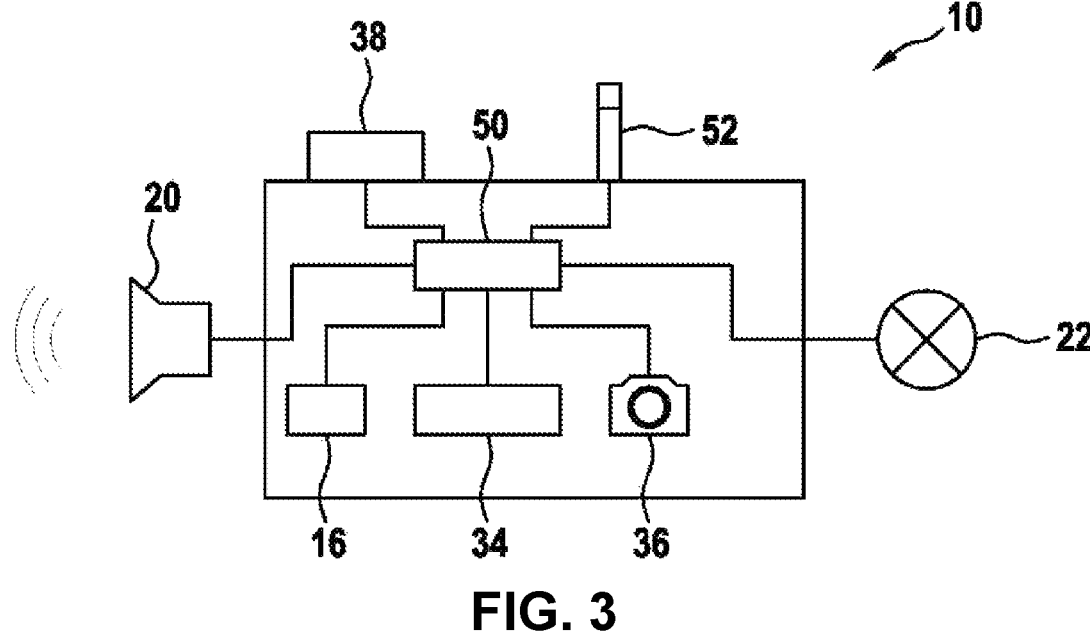
FIG. 3 is a schematic representation of the functional structure of a notification unit.

FIG. 3 is a schematic representation of the functional structure of a notification unit. A notification unit 10 comprising its functional main components is shown. A central control unit 50 is coupled to an acoustic signal device 20 and an optical signal device 22. Further, a motion sensor 16 for detection of an object in the environment of the notification unit 10 is connected to the control unit. As another component, the notification unit 10 contains an identification module 34, which is able to distinguish objects by means of their properties, such as for example an object that is permitted to enter the restricted area from an object that is not allowed to enter the restricted area. The notification unit 10 may also contain a camera 36 which is also connected to the control unit 50. Another component that may be connected to the control unit 50 in connection with the notification unit 10 is a GPS antenna 38. It can be used to determine the position of the notification unit 10 at all times. Apart from mere localization of the notification unit 10 via the GPS antenna 38, the GPS system may also be used in rescue operations. If, for example, there is an accident during forestry work, rescue workers can reach the scene of the accident immediately and accurately through the coordinates determined via the GPS system. The GPS system may also be employed in connection with survey work, in particular if several notification units 10 are connected to one another. The accuracy of such survey work on the basis of GPS coordinates which are determined by the individual notification units 10 may be sufficient for many purposes. The control unit 50 is still connected to a sender 52. It is via said sender 52, that the notification unit communicates with the central unit. In addition to the sender 52, a receiver can be provided as well such that, for example, the acoustic and/or optical signaling of the notification unit 10 can be stopped or otherwise prevented by the central unit. The receiver is not shown here. Instead of a sender 52 and a receiver, a transceiver can also be provided that assumes both tasks, that is both sending and receiving. Ultimately, all data or a selection of the data detected by the notification unit 10 should be able to be sent to the central unit via the sender 52 or the transceiver for information or storage purposes.

Figure 4:
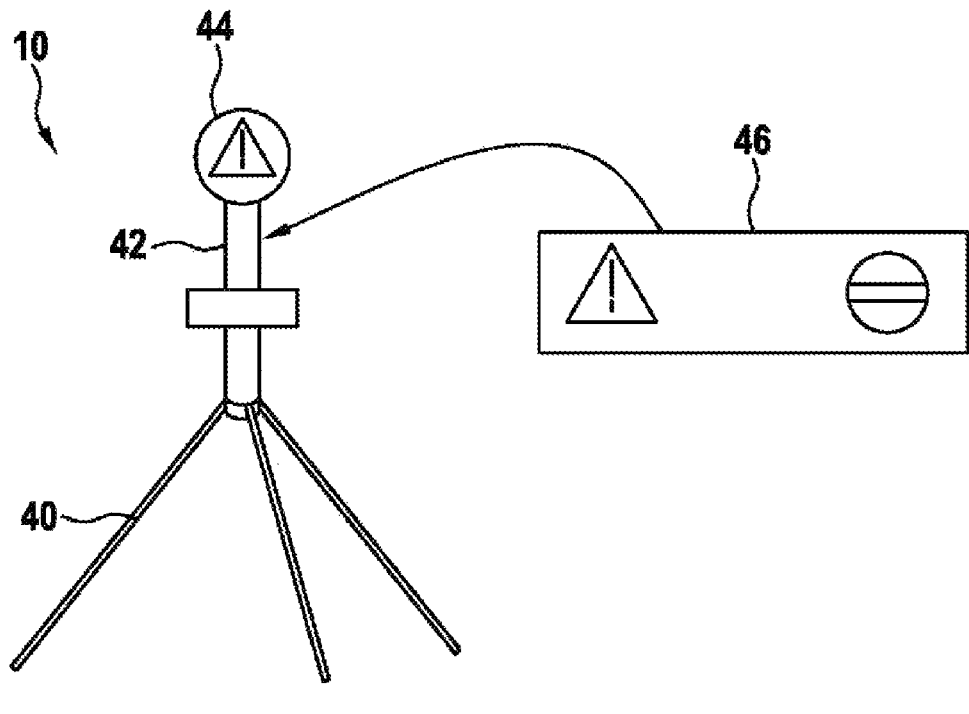
FIG. 4 is a schematic representation of the constructional properties of a notification unit.

FIG. 4 is a schematic representation of the constructional properties of a notification unit. A tripod 40 supports a tube 42 on which notification signs can be attached, for example the notification sign 44. The notification signs warn persons approaching the notification unit 10 of entering a restricted area. Inside the tube 42, a banner 46 can be stored which can be put up by means of the notification unit 10 as well. Thus, an even more extensive notification of a restricted area can be provided.

Figure 5:
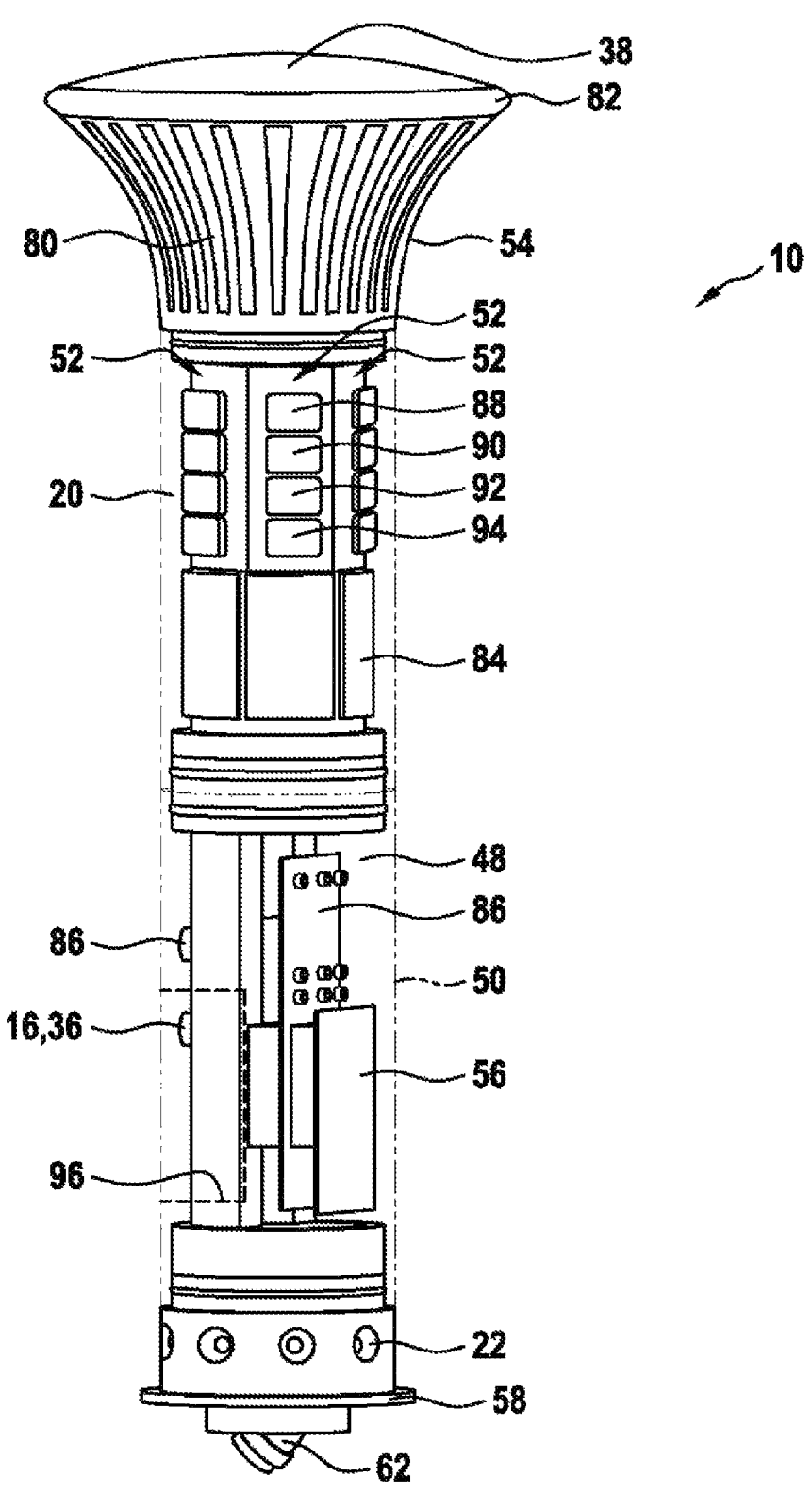
FIG. 5 is a representation of a particularly preferred notification unit.

FIG. 5 is a representation of a particularly preferred notification unit 10. The notification unit 10 has a column-like structure. The column 50 comprises an acoustic signal device 22 at a first end. The second end of the column 50 is formed by a cooling body 54. This cooling body 54 has a plurality of ribs 80. An O-ring 82 is attached to the cooling body 54 as an edge protection. A GPS antenna 38 is located at the uppermost point of the column 50. An at least partially transparent cylindrical tube is disposed between the acoustic signal device 22 and the cooling body 54, for example made of acrylic glass or of another transparent material which defines a cavity 48. Functional components of the notification unit 10 are accommodated in the cavity 48, namely in particular several LED arrangements with a plurality of LEDs 52 which emit light at different wavelengths, optionally both in the visible range as well as in the infrared range. For example, LEDs 88, 90, 92 in orange, white and red colors are provided in the visible range in addition to infrared LEDs 94. The LEDs 52 are disposed along the entire circumference of the column 50 which is cylindrical in the present example. LED driver modules 84 are located below the LEDs 52. Together with the LEDs 52, the LED driver modules 84 form an optical signal device 20. A controller unit 56 with a Bluetooth and WiFi interface as well as an input/output card 86 are provided in the cavity 48 of the column 50 below the LED driver modules 84. The motion sensor 16, which is formed as a camera 36 here, is at the same height of the column 50. The camera has a field of view of about 170 degrees. In order to increase the field of view, several cameras may be disposed around the circumference of the column 50. Apart from its function as a motion sensor 16, the camera 36 may capture images, preferably both with light in the visible range as well as in the infrared range. Thus, the camera 36 may deliver images in the dark as well as long as the monitoring area of the notification unit is illuminated by the infrared LEDs mentioned above. Preferably, the images captured by the camera 36 are sent to a neural network so as to decide whether relevant objects were detected by the camera 36. If, for example, it is only of interest to detect people, the neural network may be prepared such that corresponding notification functions of the notification unit are only activated if a person has been detected by the camera. Correspondingly, in other cases, the neural network may also be designed so that it reacts sensitively to other objects, for example animals or only certain kinds of animals. Recognizing animals, in particular wild animals or farm animals, can be useful in order to count and/or monitor them with the notification unit 10. Images captured by the camera 36 may be stored and/or sent depending on what is desired. They are preferably sent via the mentioned Bluetooth and WiFi interfaces.

Equipping the notification unit 10 with a conventional camera 36 can then be sufficient if only a restricted monitoring area is to be monitored, for example a monitoring area in an order of magnitude of a distance of up to 10 meters from the camera 36. In order to significantly increase the monitoring area, a LIDAR module may be integrated in addition to the camera. LIDAR is a system for optical distance and speed measurement. As such, objects may already be localized if they are still at a distance of 50 meters to the notification unit 10, for example. Therefore, measures for deterrence or detection of the objects can be taken much earlier when they are moving towards the notification unit 10.

The electrical interface 62 provided on the notification unit 10 may be for transmitting energy which is required for operating the notification unit 10. For example, a rechargeable battery provided in the notification unit 10 may be charged via the electrical interface 62. If an external rechargeable battery is used, the energy provided to the rechargeable battery via the electrical interface 62 may be provided to the active components of the notification unit 10. In terms of compactness of the total system, an internal rechargeable battery is to be preferred. Preferably, such a rechargeable battery is disposed in an area of the notification unit or the cavity 48 of the notification unit 10 to which a great amount of heat created during operation can be delivered if required. Thus, the charging cycle of the rechargeable battery is extended at low outer temperatures. Additionally or alternatively, a heater for the rechargeable battery may be provided. The electrical interface 62 may also serve to transmit data, wherein for this purpose, of course, generally the mentioned radio interfaces (Bluetooth and/or WiFi) of the controller unit 56 are available. If it is not desired to have any data transmission possibility independently of the radio interfaces and if it is not desired to deliver any electrical energy to the system from outside either, the electrical interface 62 may be dispensed with. In this case, replaceable rechargeable batteries may be used. These are simply replaced as required. For example, it is possible to design the notification unit 10 so that it is able to be opened, for example by removing the cooling body 54. The latter could be screwed onto the transparent tube so that the cooling body 54 can be screwed off. If a replaceable rechargeable battery is arranged in the area which is then exposed, it can be easily replaced.

The camera 36 or the several cameras of the notification unit 10 may be accommodated within the notification unit 10 in an invisible manner. For example, a concealing area 96 of the column 50 may be mirrored for this purpose so that light cannot exit from the inside to the outside in this concealing area 96, while light reaches the camera 36 from the outside to the inside without any problems. To a person encountering the notification unit 10, it is therefore not apparent at first that an image of them could be captured. However, if the person is aware that images can be captured, they still do not know at which location the camera is disposed. Therefore, attacks for deactivating cameras by means of spray paint, which can now be observed often, are hardly successful anymore. The camera 36 may also be "hidden" in another way. For example, the wall delimiting the cavity 48 could be designed in a non-transparent manner in a large area around the camera 36 or around the several cameras, wherein, however, in this non-transparent area, a plurality of regularly or irregularly disposed transparent partial areas are provided, which have only one size, through which the lens of the camera can "look". Camera lenses are disposed behind only one or only several of these transparent partial areas. Therefore, a person who wants to deactivate the camera 36 or the cameras through a spray attack does not know where to place the spray paint. Possibly, the person even does not recognize that there are openings for cameras behind the arrangement of transparent areas in a larger non-transparent area. Thus, the concealing area 96 may be designed in different ways, according to the preceding examples by mirroring or by arranging transparent and non-transparent partial areas.

It may also be desired that a person who approaches the notification unit is informed about the fact that a camera is present. Therefore, it may also be contemplated that the process of capturing images through the camera 36 is acoustically accompanied by a noise the person nearby conceives as an activation of a camera.

The basic monitoring operation of the notification unit 10 is preferably conveyed through a comparably less intensive and less threatening signal, for example through a white or an orange optical signal of comparably low intensity. If an object approaches and is recognized as a critical object, the optical signaling can become different and/or more intensive. At the same time, an acoustic signal may be output, for example a siren signal or dogs barking. It is also possible that the approaching person is addressed by the notification unit 10 by means of a human voice. Thereby, it is tried first to deter the approaching person so that they will ideally simply turn around. If this is not successful and the position of the person becomes even more critical, i.e., they approach the boundary to the restricted area or even step over the boundary, the alarm is intensified by then at the latest and images are stored or sent to the central unit by then at the latest. Together with sending any information to the central unit, an identifier of the respective notification unit 10 is transmitted as well. Therefore, the user of the central unit knows exactly from which notification unit 10 the information are sent.

Further useful features of the notification unit 10 can be a satellite telephone functionality so that an expanded communication with the notification unit 10 is possible, in particular for data transfer.

For the purpose of theft protection, the notification unit 10 can further have an acceleration sensor. When approaching the acceleration sensor, a specifically provided signal can be transmitted to the central unit.

The complete software on the basis of which the controller unit 56 works, can be updated on a regular basis, either via an app which is installed on the central unit or another (mobile) device or via a data interface which is part of the electric interface 62, for example.

Further, a mechanical interface 58 is provided in the lower region of the column 50. The column can be mounted on a carrier via this mechanical interface 58, for example a flange or a component of a bayonet coupling.

Figure 6:
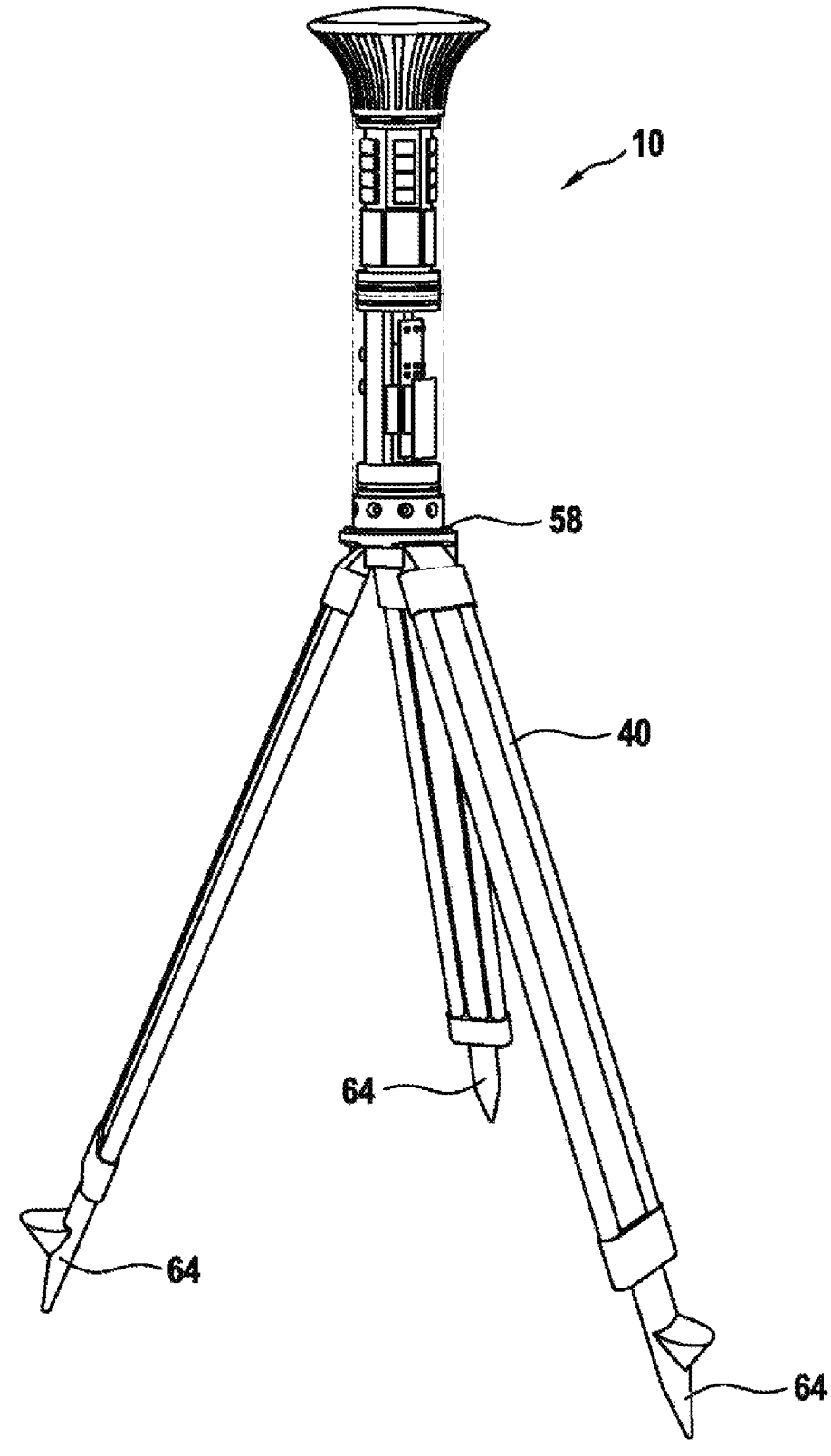
FIG. 6 shows the notification unit according to FIG. 5 on a tripod.

FIG. 6 shows the notification unit 10 according to FIG. 5 on a tripod. Here, the notification unit 10 is mounted on a tripod 40 via the mechanical interface 48. Corresponding to the number of the legs, the tripod 40 has three feet 64. The tripod 40 can be adjusted in height so that the notification unit 10 can find a save stand on uneven terrain as well.

Figure 7:
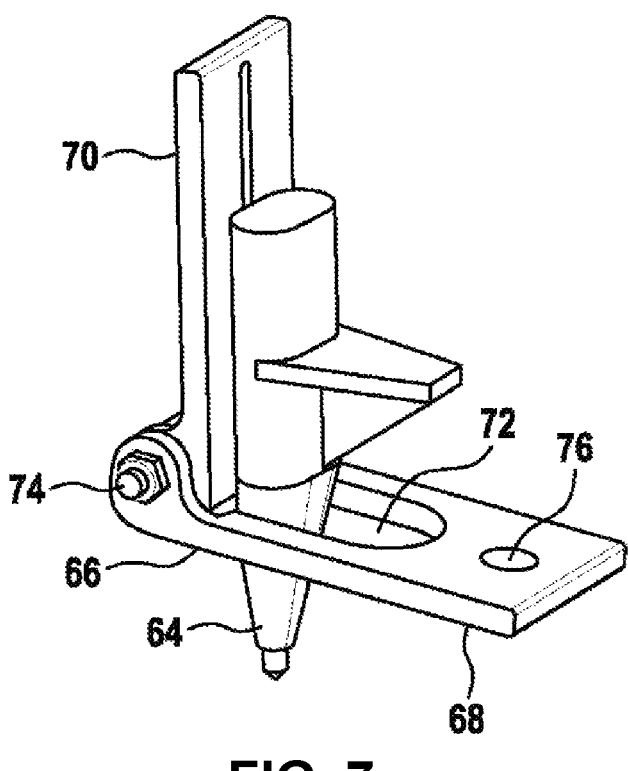
FIG. 7 is a perspective representation of an anchoring device with a foot of a tripod.
Figure 8:
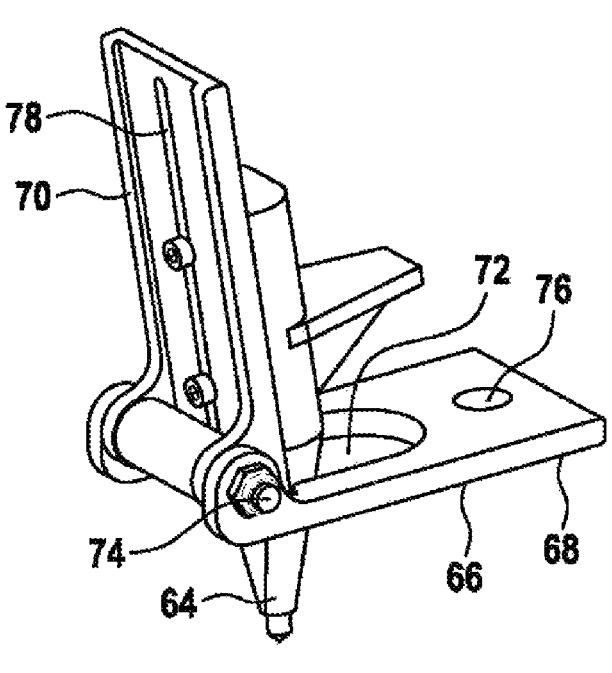
FIG. 8 is a further perspective representation of an anchoring device with a foot of a tripod.

FIG. 7 is a perspective representation of an anchoring device 66 with a foot 64 of a tripod 40. FIG. 8 is a further perspective representation of an anchoring device 66 with a foot 64 of a tripod 40. In order to prevent tilting of the notification unit 10, the feet 64 of the tripod 40 may be fixed to the ground by means of anchoring devices 66. It may be sufficient to provide an anchoring device 66 only on one foot 64. In particularly difficult circumstances, anchoring devices 66 can be attached to all feet 64. An anchoring device 66 comprises a base plate 68 and a leg plate 70. The base plate 68 and the leg plate 70 are pivotably connected to one another via a pivot axis 74. The base plate 68 has a recess 72 through which a foot 64 may pass. Further, a hole 76 is provided in the base plate 68 through which an anchoring device may be driven into the ground, for example a peg or a ground screw. The foot 64 is attached to the leg disk 70, namely via a longitudinal hole 78. Thus, the foot 64 can be mounted at different heights on the anchoring device 66.

Figure 9:
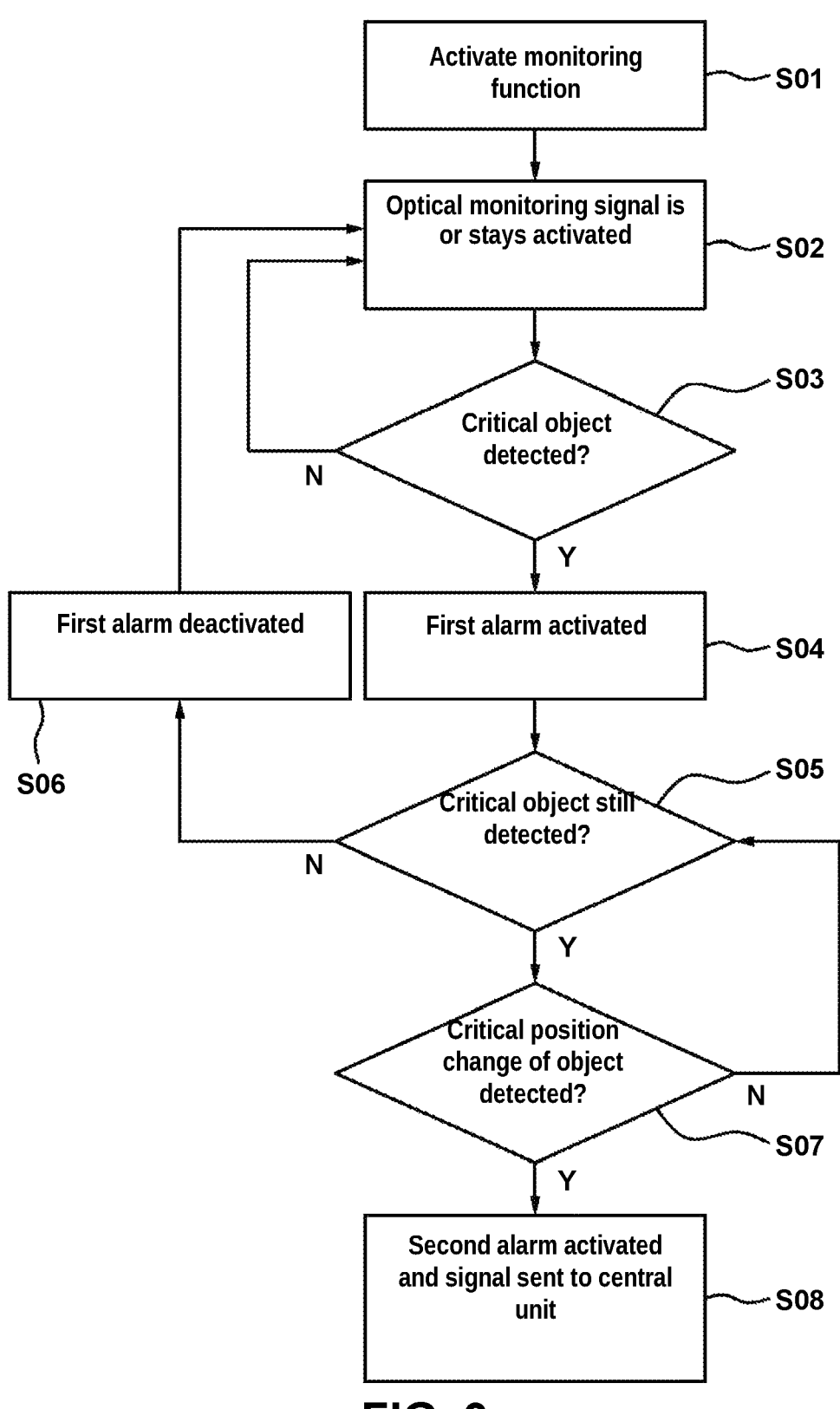
FIG. 9 is a flow chart of a method for operating a warning system.

FIG. 9 is a flow chart of a method for operating a warning system. First, the monitoring function is activated in step S01. Preferably, a less intensive, but still sufficiently noticeable optical monitoring signal is activated in step S02. If a critical object is detected in step S03, a first alarm is activated. This is done in step S04. Such an alarm can be accomplished by changing the optical signal and/or by an acoustic signal. However, as long as no critical object is detected in step S03, only the optical monitoring signal is output. After the first alarm has been activated in step S04, it is checked in step S05 whether the critical object is still detected. Ideally, this is not the case. Then, the notification unit has fulfilled its particularly desired deterrent function. The method sequence then proceeds to step S06 where the first alarm is deactivated again, wherein subsequently in step S02, the optical monitoring signal is re-activated. However, when it is determined in step S05 that the critical object is still detected, there is a further check in step S07. Here, it is determined whether there has been a critical position change of the detected object. If this is not the case, it is sustainably further checked whether the critical object is detected, namely in step S05. The method sequence can then furthermore return to the mere monitoring according to step S02 again, namely via deactivating the first alarm S06. But if a critical position change of the object is detected in step S07, either by approximation of the object to the notification unit or even by stepping over the boundary to the restricted area, a second alarm is activated in step S08, for example through enhanced optical and acoustic signals. Further, a signal is sent to the central unit, preferably accompanied by an identifier of the notification unit and one or more images of the detected object.

FIG. 10 is a flow chart of a method for image recognition. In step S01, an image is detected by a camera. In step S02, the corresponding image data or already processed image data is handed over to a neural network. In step S03, the data is then processed by means of algorithms of the neural network which are based on an image database of critical objects. If, for example, only the recognition of humans is of interest, the image database will contain images of humans in the most different positions and environments. In step S04 it is then checked whether the image data of the detected image corresponds to the image data of the critical objects from the image database. In doing so, a reliability is always determined, wherein this determined reliability should be above a specified reliability threshold. If this is the case, it is determined according to step S05 that a critical object was detected. Otherwise, it is determined in step S06 that no critical object was detected.

The features of the invention disclosed in the preceding description, in the figures as well as in the claims can be essential for the implementation of the invention both individually and in any combination.

LIST OF REFERENCE NUMERALS

10 notification unit
12 boundary
14 restricted area
16 motion sensor
18 objects
20 optical signal device
22 acoustic signal device
24 central unit
26 user
28 communication unit
30 hearing protection
32 cellular phone
34 identification module
36 camera
38 GPS antenna
40 tripod, carrier
42 tube
44 notification sign
46 notification banner
48 cavity
50 column
52 LEDs
54 cooling body

56 controller unit
58 mechanical interface
62 electrical interface
64 foot
66 anchoring device
68 base plate
70 leg plate
72 recess
74 pivot axis
76 hole
78 longitudinal hole
80 rib
82 O-ring
84 LED driver module
86 LIDAR module
88 LED, white
90 LED, orange
92 LED, red
94 LED, infrared
96 concealing area

The invention claimed is:

1. A notification unit comprising:
at least one motion sensor, which detects movements of objects in the environment of the notification unit, and
at least one signal device which is suitable for outputting different optical or acoustic signals,
wherein the type of the different optical or acoustic signals depends on whether the motion sensor has detected a movement of an object in the environment of the notification unit,
wherein the notification unit is at least partially formed as a column defining a cavity with a first end and a second end and wherein functional components of the notification unit are disposed in the cavity.

2. The notification unit according to claim 1, wherein an optical signal device having several LEDs is provided in the cavity.

3. The notification unit according to claim 1, wherein the cavity is delimited by an acoustic signal device at the first end of the column.

4. The notification unit according to claim 1, wherein a camera is disposed in the cavity which is both the motion sensor and an image capturing unit.

5. The notification unit according to claim 1, wherein the cavity is delimited by a cooling body at the second end of the column.

6. The notification unit according to claim 1, wherein a GPS antenna is provided at the second end of the column.

7. The notification unit according to claim 5, wherein the LEDs are disposed adjacent to the cooling body.

8. The notification unit according to claim 1, wherein a mechanical interface is provided at the first end of the column for coupling the column to a carrier.

9. The notification unit according to claim 8, wherein the carrier is a tripod with three feet.

10. The notification unit according to claim 9, wherein an anchoring device is provided for at least one of the feet.

11. The notification unit according to claim 10, wherein the anchoring device has a first base plate to be disposed parallel to the ground and a second leg plate to be disposed parallel to a leg, wherein the base plate and the leg plate are pivotably connected to one another via a pivot axis.

12. A notification unit comprising:
at least one motion sensor, which detects movements of objects in the environment of the notification unit, and
at least one signal device which is suitable for outputting different optical or acoustic signals, wherein the type of the different optical or acoustic signals depends on whether the motion sensor has detected a movement of an object in the environment of the notification unit,
wherein the notification unit is at least partially formed as a column defining a cavity with a first end and a second end and wherein functional components of the notification unit are disposed in the cavity,
wherein a mechanical interface is provided at the first end of the column for coupling the column to a carrier,
wherein the carrier is a tripod with three feet,
wherein an anchoring device is provided for at least one of the feet,
wherein the anchoring device has a first base plate to be disposed parallel to the ground and a second leg plate to be disposed parallel to the leg,
wherein the base plate and the leg plate are pivotably connected to one another via a pivot axis.

13. The notification unit according to claim 12, wherein the leg plate has a longitudinal hole for a variable fastening of a foot of the tripod.

14. A warning system comprising:
a notification unit comprising:
at least one motion sensor, which detects movements of objects in the environment of the notification unit, and at least one signal device which is suitable for outputting different optical or acoustic signals,
wherein the type of the different optical or acoustic signals depends on whether the motion sensor has detected a movement of an object in the environment of the notification unit,
wherein the notification unit is at least partially formed as a column defining a cavity with a first end and a second end and wherein functional components of the notification unit are disposed in the cavity, and
a central unit which is suitable for receiving a signal sent via radio from the at least one notification unit and to then output a notification to a user of the central unit.

15. A method for operating a warning system, the warning system comprising
a notification unit comprising:
at least one motion sensor, which detects movements of objects in the environment of the notification unit, and at least one signal device which is suitable for outputting different optical or acoustic signals,
wherein the type of the different optical or acoustic signals depends on whether the motion sensor has detected a movement of an object in the environment of the notification unit,
wherein the notification unit is at least partially formed as a column defining a cavity with a first end and a second end and wherein functional components of the notification unit are disposed in the cavity,
a central unit which is suitable for receiving a signal sent via radio from the at least one notification unit and to then output a notification to a user of the central unit;
the method comprising the steps of:
optically monitoring a monitoring area,
detecting a critical object and a location of the critical object in the monitoring area,
activating a first alarm through the and at the notification unit,
detecting a critical location change of the object, and
activating a second alarm, which is different from the first alarm, through the and at the notification unit.

16. The notification unit according to claim 12, wherein the base plate has a recess for a foot of the tripod to pass through and a hole for a fastening anchor to pass through.

* * * * *